United States Patent
Sharkey et al.

(10) Patent No.: US 7,548,921 B1
(45) Date of Patent: Jun. 16, 2009

(54) METHOD AND APPARATUS FOR TRANSMITTING FILES

(75) Inventors: Jeffrey L. Sharkey, Hermosa Beach, CA (US); Kenneth D. Seibert, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1824 days.

(21) Appl. No.: 09/649,651

(22) Filed: Aug. 29, 2000

(51) Int. Cl.
*G06F 17/30* (2006.01)

(52) U.S. Cl. .......................... 707/10; 707/204; 709/201

(58) Field of Classification Search ......... 707/101–102, 707/204, 2, 10, 1, 100, 104.1, 200; 709/217–219, 709/100–101, 102, 201, 202, 203, 200, 216; 725/63; 710/17; 711/100, 161
See application file for complete search history.

(56) References Cited

U.S. PATENT DOCUMENTS

| | | | | |
|---|---|---|---|---|
| 5,404,505 A * | 4/1995 | Levinson | ................ | 707/10 |
| 5,530,899 A * | 6/1996 | MacDonald | ................ | 710/17 |
| 5,870,553 A * | 2/1999 | Shaw et al. | ................ | 709/219 |
| 6,115,035 A * | 9/2000 | Compton et al. | ................ | 345/717 |
| 6,151,497 A * | 11/2000 | Yee et al. | ................ | 455/430 |
| 6,292,473 B1 * | 9/2001 | Duske et al. | ................ | 370/316 |
| 6,338,094 B1 * | 1/2002 | Scott et al. | ................ | 709/245 |
| 6,381,626 B1 * | 4/2002 | De Leo et al. | ................ | 709/200 |
| 6,438,233 B1 * | 8/2002 | Yoshimune et al. | ................ | 380/241 |
| 6,442,598 B1 * | 8/2002 | Wright et al. | ................ | 709/217 |
| 6,459,427 B1 * | 10/2002 | Mao et al. | ................ | 725/109 |
| 6,519,568 B1 * | 2/2003 | Harvey et al. | ................ | 705/1 |
| 6,546,488 B2 * | 4/2003 | Dillon et al. | ................ | 713/181 |
| 6,643,663 B1 * | 11/2003 | Dabney et al. | ................ | 707/102 |
| 2001/0023429 A1 * | 9/2001 | Barker et al. | | |

OTHER PUBLICATIONS

Microsoft Press Computer Dictionary, 1997, Microsoft Press, 3rd Edition, p. 195.*
Togawa, Atsushi "Arithmetic Processing System and Arithmetic Processing Control Method, Task Management Method, and Storage Medium", Jun. 19, 2003, p. 7, paragraph 108.*

* cited by examiner

Primary Examiner—Greta L Robinson

(57) ABSTRACT

A method, apparatus, and an article of manufacture provide the ability to transmit files/web content. Content files are gathered by a web caster application and the files are updated, fragmented, prepared, and scheduled for transmission. The web caster stores the files in an archive of prepared files and adds/updates a queue of files (sorted by date/time) that contain filenames of the files in the archive. A web player reads a file at the head of the queue and obtains the name and location of the archived file. The web player commands a transmission process to retrieve and transmit the appropriate file to a satellite for broadcasting to one or mote clients.

24 Claims, 3 Drawing Sheets

METHOD AND APPARATUS FOR TRANSMITTING FILES

BACKGROUND OF THE INVENTION

1. Field of the Invention

The present invention relates to systems and methods for broadcasting information, and in particular to a system and method for coordinating, selecting, gathering, processing, and transmitting files/web content.

2. Description of the Related Art

As Internet access has become more widely available, computer users are more frequently utilizing the Internet and the World Wide Web to access email, information, files, data, etc. One of the most common mechanisms utilized for accessing the Internet is a modem. However, modem access is often slow causing delays in retrieving information and email. Methods to increase the access speed include direct subscriber lines (DSL), cable modems, and integrated services digital network (ISDN) connections.

One method utilized to increase Internet access is the DirecPC™ model. With DirecPC, consumers bypass the phone system for receiving data, a high-volume aspect of the web. All of the low-bandwidth, outbound information (like Uniform Resource Locator (URL) requests) is sent out by modem over the telephone lines. The return path, including high-bandwidth responses from the Internet is by satellite.

With DirecPC, when a customer requests a URL, the request gets sent by modem to their Internet Service Provider (ISP). However, before the request leaves the customer's personal computer (PC), the system attaches a "tunneling code". A "tunneling code" is essentially an electronic addressing mask to the URL. That code instructs the ISP to forward the URL request to the DirecPC Network Operations Center (NOC) instead of the server at the site requested. Once the NOC receives the customer's request, the tunneling code is stripped away and the request is then forwarded by multiple T-3 lines to the appropriate site, and the desired content is retrieved. The NOC then uploads the information to a satellite, which transmits the information down to the customer's satellite dish and the customer's PC.

Alternative access methods may utilize a non-interactive approach wherein information is gathered and broadcast by satellite where it is received by satellite dishes and PCs. The information is transferred to a user's local cache where it may be displayed. However, instead of interactively determining what a user wants to view, only a predetermined set of selected information is broadcast by the satellite.

To format and transmit information to a user, existing systems may use either database coupling (which provides many fault recovery advantages, but has reliability and great efficiency disadvantages) or a one way file queue, which is very efficient, but not as flexible, not as time coupled, and not as good in fault recoveries.

What is needed is a method for increased Internet access speed while maintaining interactive capabilities. Additionally, what is needed is a method for facilitating the gathering, compression, and transmission/broadcast of information across the Internet to a user.

SUMMARY OF THE INVENTION

To address the requirements described above, the present invention discloses a method, apparatus, and an article of manufacture for transmitting files, web content, email, newsgroup broadcast, etc. (collectively referred to as content files, files, web content files, or information). Content files are gathered by a web caster application. The web caster application updates, fragments, prepares, and schedules the files for transmission. Once prepared and scheduled, the web caster stores the files in an archive of prepared files. Once the files are stored in the archive, the web caster adds/updates a queue of files that contain filenames of the files in the archive. The queue is sorted by date/time. Thus, each time a file is added to the archive by the web caster, the web caster adds the filename to the end of the queue.

A web player reads a file at the head of the queue and obtains the name and location of the archived file. Thereafter, the web player commands a transmission process to retrieve and transmit the appropriate file to a satellite for broadcasting to one or more clients. Once a transmission completes or fails, the web player may reset the date/time of the file and rename the file in the archive thereby causing the respective filename to be placed at the end of the queue. Consequently, the queue is circular and the files in archive are continuously transmitted to a satellite regardless of the continuing operation of the web caster.

Alternatively, the files may be deleted subsequent to a completed or failed transmission to the satellite. In such an embodiment, the web player may maintain a length/time feedback file that contains the length of the queue. The web caster checks the length/time feedback file and whenever the queue reaches a predetermined level, the web caster may fill the queue by adding the respective files into the archive and adding/updating the respective filenames in the queue.

By utilizing a web caster, web player, and maintaining a queue of files of filenames, only the filenames and lengths need to be read by web player resulting in fewer disk reads or writes. Further, inconsistencies are eliminated/reduced and the transmission of content files to a satellite is more efficient.

The method, apparatus, system, and article of manufacture for the invention comprise various manners for obtaining, storing, transmitting, and broadcasting files and information. For example, the article of manufacture may comprise a data storage device tangibly embodying instructions to perform the logic of the invention as described above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
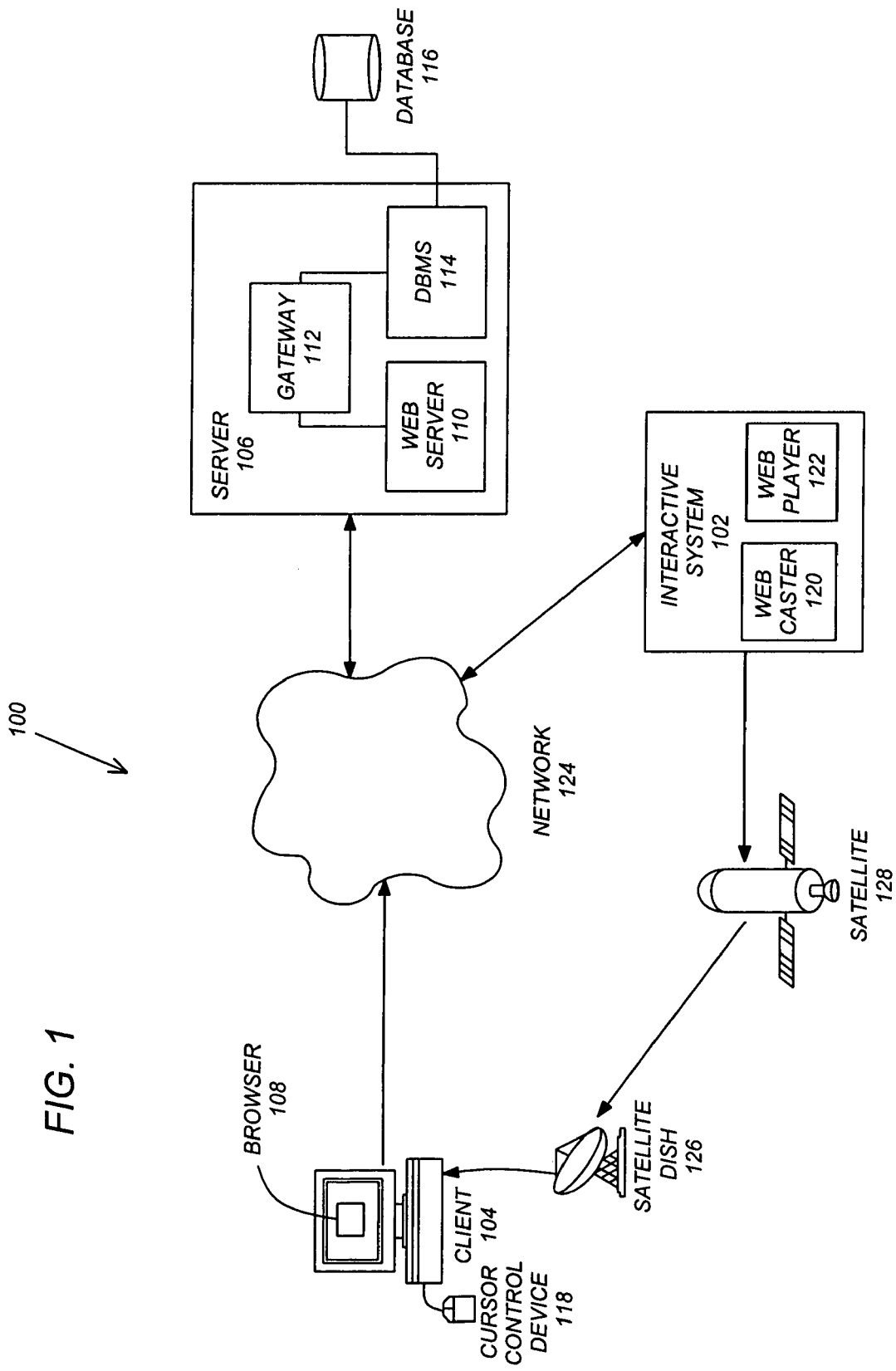
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a distributed computer system 100 comprising a network 124 that facilitates communication between client computers 104 and server computers 106. A typical combination of resources may include a network 124 comprising the Internet, LANs, WANs, SNA networks, or the like, clients 104 that are personal computers or workstations, and servers 106 that are personal computers, workstations, minicomputers, or mainframes. Additionally, both client 104 and server 106 may receive input (e.g., cursor location input) and display a cursor in response to an input device such as cursor control device 118.

Internet 124 facilitates communication between client computers 104 executing Web browsers 108 and server computers 106 executing Web servers 110. The Web browser 108 is typically a program such as NETSCAPE NAVIGATOR or MICROSOFT INTERNET EXPLORER. Further, as described below, the software may be downloaded from server computer 106 to client computer 104 through interactive system 102, satellite 128, and satellite dish 126, and installed as a plug in or ActiveX control of Web browser 108. The Web server 110 is typically a program such as IBM's HyperText Transport Protocol (HTTP) Server or Microsoft's Internet Information Server. Servers 106 may also execute a Common Gateway Interface (CGI) 112, which interfaces between the Web server 110 and a database management system (DBMS) 114. DBMS 114 in turn may interact and control information stored in database 116. Alternatively, client 104 may be any medium capable of the reception and display of content. Content may include multimedia clips to be displayed on a television (via an attached set top box), news stories to be displayed on a pager, event or advertising information in a kiosk, reception via any wireless system including but not limited to ATSC, cellular, satellite, G3, as well as terrestrial distribution, specifically cable. The receiver may be a television connected to a set top box, but could as easily be a home networking portal that receives its signals via satellite, cable, or other means and distributes throughout the home to televisions, computers, hand helds, and other devices.

Client 104 requests a web page (e.g., HTTP/HTML content), email, newsgroup broadcasts (e.g., NTTP), etc. (collectively referred to as content files, files, web content files, or information) by transmitting a URL or other request across network 124. The request may be intercepted by interactive system 102. Interactive system 102 communicates with server 106 across network 124 to gather the information, compress the information, create a queue of files containing the information, and transmit the files in the queue to satellite 128. Interactive system 102 may accomplish these tasks using web caster 120, web player 122, and other components/features. Once received, satellite 128 broadcasts the files/information where it is received by a client's 104 satellite dish 126 for further use on client 104.

Generally, these components 108, 110, 112, 114, 120, and 122 all comprise logic and/or data that is embodied in or retrievable from device, medium, signal, or carrier, e.g., a data storage device, a data communications device, a remote computer or device coupled to the computer via across a network or via another data communications device, etc. Moreover, this logic and/or data, when read, executed, and/or interpreted, results in the steps necessary to implement and/or use the present invention being performed.

Thus, embodiments of the invention may be implemented as a method, system, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Process Overview

Streams of prepared files (of various types) may be broadcast by satellite 128 in cycles of varying length and with differing content on each cycle. For some types of content, one or more host machines/processes may be required to develop/select content to be transmitted (e.g., web caster 120), and another machine/process may be required to control the timing, rates, and other aspects of the broadcast (e.g., web player 122). Interactive system 102 controls the interaction/communication link between these two machines/processes. Web caster 120 maintains an archive of prepared files and a queue of the names of the files in the archive sorted by date/time. The web player 122 reads a filename from the queue and causes the corresponding file in the archive to be transmitted to the satellite 128. Once a file has been transmitted, the file may either be deleted or the date/time may be reset and the name changed. The queue is then updated to reflect the current state of the archive.

Process Components

Figure 2:
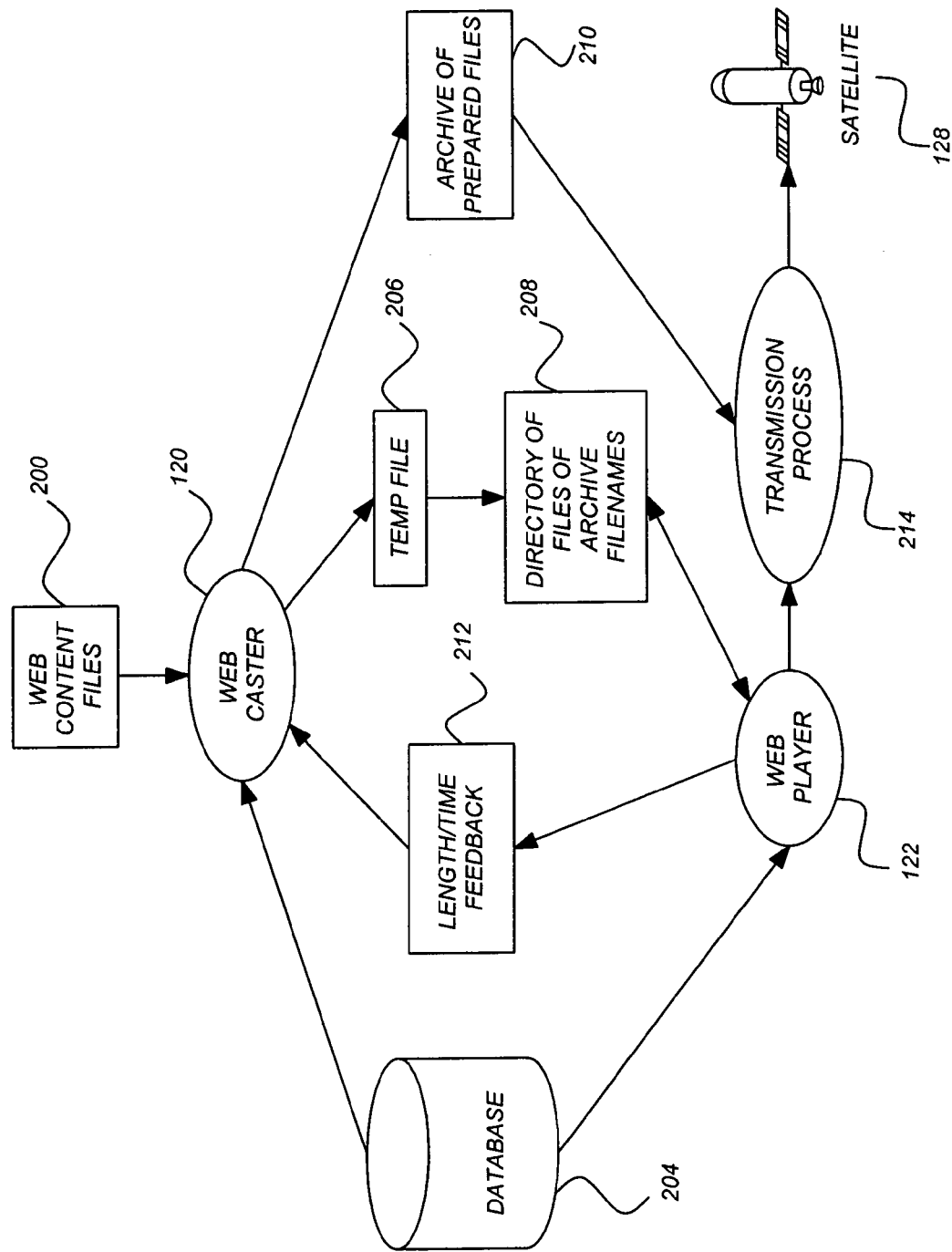
FIG. 2 illustrates the details of an interactive system and the interaction between a web caster and web player in accordance with one or more embodiments of the invention.

FIG. 2 illustrates the details of interactive system 102 and the interaction between a web caster 120 and web player 122 in accordance with one or more embodiments of the invention. Interactive system 102 is directable by a separate database 204 or information source. Accordingly, database 204 maintains configuration information such as scheduling, routing, and broadcast transmission parameters for multiple scheduled downloads and queued processes. Information from database 204 may be read or written every five (5) minutes by web caster 120 and web player 122. Additionally, interactive system 102 is reliable, efficient, coupled (so that the source machine 120 and transmission controller machine 122 do not get out of synchronization with one another), and recoverable (so that the cycle is not lost immediately if either machine 120-122 develops a problem). Further, the coupling/queuing link of system 102 is relatively low bandwidth and robust so that if either machine 120-122 fails, the other machine 120-122 can continue and allow the failed machine 120-122 to restart without the healthy machine 120-122 needing to be reset.

Web caster 120 receives, gathers, and/or generates raw content 200 and determines if the content is new or unchanged from the last read (i.e., the last time content 200 was received). Web caster 120 then performs optimal scheduling of the files 200. Web caster 120 causes the files 200 to be updated, prepared (fragmented), and written to archive 210 as needed. Accordingly, the archive of prepared files 210 contain files that are prefragmented, prepared, and ready for transmission.

To access and maintain knowledge of the information in archive 210, web caster 120 writes a queue 208 of the names of the files in archive 210. The queue 208 is in first-in-first-out (FIFO) order and may be referred to as queue 208 or the directory of files of archive filenames 208. The queue 208 is created by writing the information to temporary file 206 every fifteen minutes, which immediately stores the information in the queue 208. So that web caster 120 knows when to add files to archive 210 and to queue 208, web player 122 may maintain the number of items remaining in queue 208 in a length/time feedback file 212. The length/time feedback file 216 may be read every five (5) minutes by web caster 120 to determine how much information needs to be added to the queue (i.e., the queue of information waiting to be transmitted) each cycle.

Based on the queue 208, web player 122 commands the transmission process 214 to process the desired files from archive 210. Once the files are delivered from archive 210 to transmission process 214, Web player 122 may write feedback information to the length/time feedback file 212 for the web caster 120 to utilize. As described, such feedback information may include date/time information and the size of the queue (of files to be transmitted). Web player 122 may write to the length/time feedback file 212 every five minutes. Length/time feedback file 212 is a single line file containing the date, time, and current queue length. Both web player 122 and web caster 120 derive the name of the file from the name of the directory of files of archive filenames.

Temporary file 206 is a file whose name is derived from the name of queue 208 by both the web player 122 and web caster 120. Temporary file 206 is written by web caster 120 and then the file is renamed into the directory of files of archive filenames 208 by remove commands from web caster 120. The purpose of temporary file 206 is to prevent any read/write conflicts between the web caster 120 and web player 122.

The queue 208 is written to by remote renaming of temporary file 206 by web caster 120. Each element in queue 208 is a file (referred to as a file of filenames (FOFN)) containing a list of filenames and lengths. Each FOFN is read and buffered in web player 122 and as each FOFN in queue 208 has completed being read and buffered, that FOFN is erased from the queue 208 by the web player 122. The name of queue 208 is based on an entry in database 204 and generated in both web caster 120 and web player 122.

The archive of prepared files 210 contains the final prepared files ready for transmission. The names of the files are provided in each element/FOFN stored in queue 208.

The transmission process 214 provides for multiple processes that are invoked by web player 122 given the filename and the transmission and routing parameters. Transmission process 214 causes identified files to be continuously read from archive 210 and transmitted to satellite 128. These processes may be immediate and have no timing control.

Process Details

At start up and at a regular interval thereafter (e.g., five (5) minutes), both the web player 122 and web caster 120 read the relevant configuration information from database 204. The configuration information provides the transmission, queuing, and routing details and information necessary (and common to all files being sent by web caster 120) for queuing to both. Each instance of web caster 120 produces one queue 208. Web player 122 handles multiple queues 208 and independently scheduled downloads.

Web caster 120 has multiple webcrawlers bringing in a large volume of web site information 200 to a single central location. However, due to bandwidth limitations from a single central location (e.g., a building in El Segundo, Calif.) to an additional location (e.g., a building/broadcast center in Denver, Colo.) where remaining components/elements of the system may be located, the volume of information passing back and forth may be minimized.

The name of the directory of files of archive filenames (DOFOFN)/queue 208 is generated using the prefix from the database 204 and a fixed suffix embedded in both web player 122 and web caster 120. The reason for generating such a name is that web player 122 may effectively act as a virus directed at whatever directory 208 the database 204 record points to, reading and then erasing every file in the directory 208. To protect against a typographical error in the database 204 generating a serious loss of data, the suffix is appended which is picked to be so uncommon that the likelihood of another directory 208 being damaged is remote. For example, the database 204 may contain a directory/folder "/webcast", and the suffix in both processes 120-122 may be "/zzyzx7" so the actual directory 208 name is "/webcast/zzyzx7". While the suffix is fixed, the name generation method allows an infinite number of directory 208 names in virtually any structure. The name of the length/time feedback file 206 is also generated. For example, the length/time feedback file 206 name may be "/webcast/zzyzx7.len", and the temporary file 206 name may be "/webcast/prefrag.tmp".

Once both processes 120-122 have determined the file names, the queuing process begins. Each instance of web caster 120 typically generates its queue of files of filenames 208 every 15 minutes. Web caster 120 reads the contents of the length/time feedback (LTF) file 212 and finds one of four conditions:

1. No LTF file 212 found;
2. LTF file 212 is available but the date/time is old;
3. LTF file 212 is available, date is current, and the reported size of the queue 208 is less than the normal full queue size; and
4. LTF file 212 is available, date is current, and the reported size of the queue is greater than the normal full queue size.

In condition 1, it is assumed that web player 122 is dead. Accordingly, a normal size queue 208 is filled with files of filenames that are stored in archive 210. Additional elements are not added to the queue 208 until a valid. LTF file 206 can be read.

In condition 2, it is assumed that the web player 122 stopped at the time identified in the LTF file 212. Accordingly, elements (e.g., files of filenames that are stored in archive 210) are added to queue 208 until the reported size (from web player 122) of the queue 208 is full. Thereafter, no additional elements are added until the LTF file 206 is updated by web player 122.

In condition 3, since the queue 208 is not full, elements/files are added to the queue 208 until the queue 208 is full.

In condition 4, it is assumed that the web player 122 or downstream transmission process is falling behind or halted. Files/elements are not added to the queue 208 until the LTF file 212 is updated and the reported queue size is less than the normal full queue size.

The normal queue size comprises the bandwidth multiplied by the web caster 120 cycle time multiplied by a factor:

Full queue size bandwidth*web caster cycle time*factor

Accordingly, based on the conditions and actions taken as indicated above, the web caster 120 adds files of file names (FOFN) to the DOFOFN/queue 208 if necessary. The FOFNs contain a list of files and their respective sizes and are written to the DOFOFN/queue 208 such that each of the files of file names takes ½ minute to 5 minutes to finish transmitting. During each cycle, when FOFN elements are added to queue 208 by web caster 120, web caster 120 may also update/add files to archive 210 as necessary and perform optimal scheduling of the file transmissions based on a fuzzy algorithm.

Web player 122 obtains a directory list from DOFOFN/queue 208 in date/time creation order and buffers that list (i.e., web player 122 reads the queue 208 of FOFNs). Web player 122 then reads each of the FOFNs starting with the oldest FOFN and copies the filenames and lengths from queue 208 into another buffer. Web player 122 proceeds to command the transmission process 214 to transmit the files (corresponding to the filenames read from queue 208 beginning with the oldest file) from archive 210 to satellite 128 in order, erasing each FOFN file 210 from queue 208 (and potentially each file from archive 210) when each file has completed transmitting. The transmission process 214 may utilize a broadcast transmission transfer protocol (BFTP), broadcast transmission download protocol (BFDP), or any downstream broadcast process for processing the data. A bridge may be utilized to meter the bandwidth of the stream being transmitted to ensure proper transmission by the broadcast process 214. Accordingly, if the broadcast process 214 transmits at a faster rate than data is being stored, the bridge will monitor the bandwidth to ensure that the entire file is transmitted (and that the transmission by broadcast process 214 is not stopped prior to the transmission of all of the data). Web player 122 obtains the directory list/queue 208 and performs the FOFN buffering (e.g., every five (5) minutes) and continues to update the LTF file 212 with the current date/time and length of the queue 208 information. In the event of a failure of transmission of a file or an unreadable FOFN, web player 122 deletes the current FOFN file.

Alternatively, instead of deleting each FOFN from queue 208 (or file from archive 210) once the file has finished being transmitted (or failed to transmit), web player 122 may change the date/time stamp on the file in archive 210 and rename the archived file. To change the date/time stamp of the file, web player 122 may "touch" the file. By "touching" the file, the date/time stamp of the file becomes the newest file in archive 210. Subsequently, the queue 208 is updated with the new file name and date. Thus, the most recently transmitted file (with a new name) goes back into the queue 208 (which is processed in FIFO order) for transmission again.

Additionally, to ensure that an entire file in archive 210 is utilized, a new file that has some changes from a file already existing in archive 210, may be transferred into archive 210 with an added suffix so that the old file is not overwritten during the storage of the file in archive 210. Once the new file has completed being stored in archive 210, the filename of the new file is modified by deleting the added suffix. Such a filename change overwrites the existing old file in the archive 210 and is instantaneous so that there is no time differential between a file being written and read.

Accordingly, each FOFN/element is placed back at the end of the queue with a new name. Thus, the queue 208 is circular thereby providing fault tolerance. For example, if the web caster 120 fails and no new content is placed into archive 210, files from archive 210 will still be transmitted because the files are retransmitted when the FOFN makes its way through the queue 208 again. Further, when a file in archive 210 is updated by web caster 120 (e.g., when the web page or content in a file in archive 210 is modified or updated), the existing FOFN in queue 208 is also updated again to place the FOFN at the end of queue 208. Since queue 208 is circular and FOFNs are not deleted from queue 208 (unless web caster 120 modifies or replaces the FOFN with a new FOFN) the length/time feedback file 206 is no longer needed to indicate the length of queue 208. Accordingly, length/time feedback file 206 may not exist in such an embodiment, and files from archive 210 are continuously transmitted by web player 122 based on queue 208.

Alternative Embodiments

Various alternatives may be utilized in accordance with one or more embodiments of the invention. For example, in one embodiment, a schedule record points to one single large file in a database 116 that is to be broadcast by satellite 128 and a web caster 120 or web player 122 is not utilized. However in such an embodiment, transmission is inefficient and there are inconsistency problems between the database 116 and the actual files transmitted.

Figure 3:
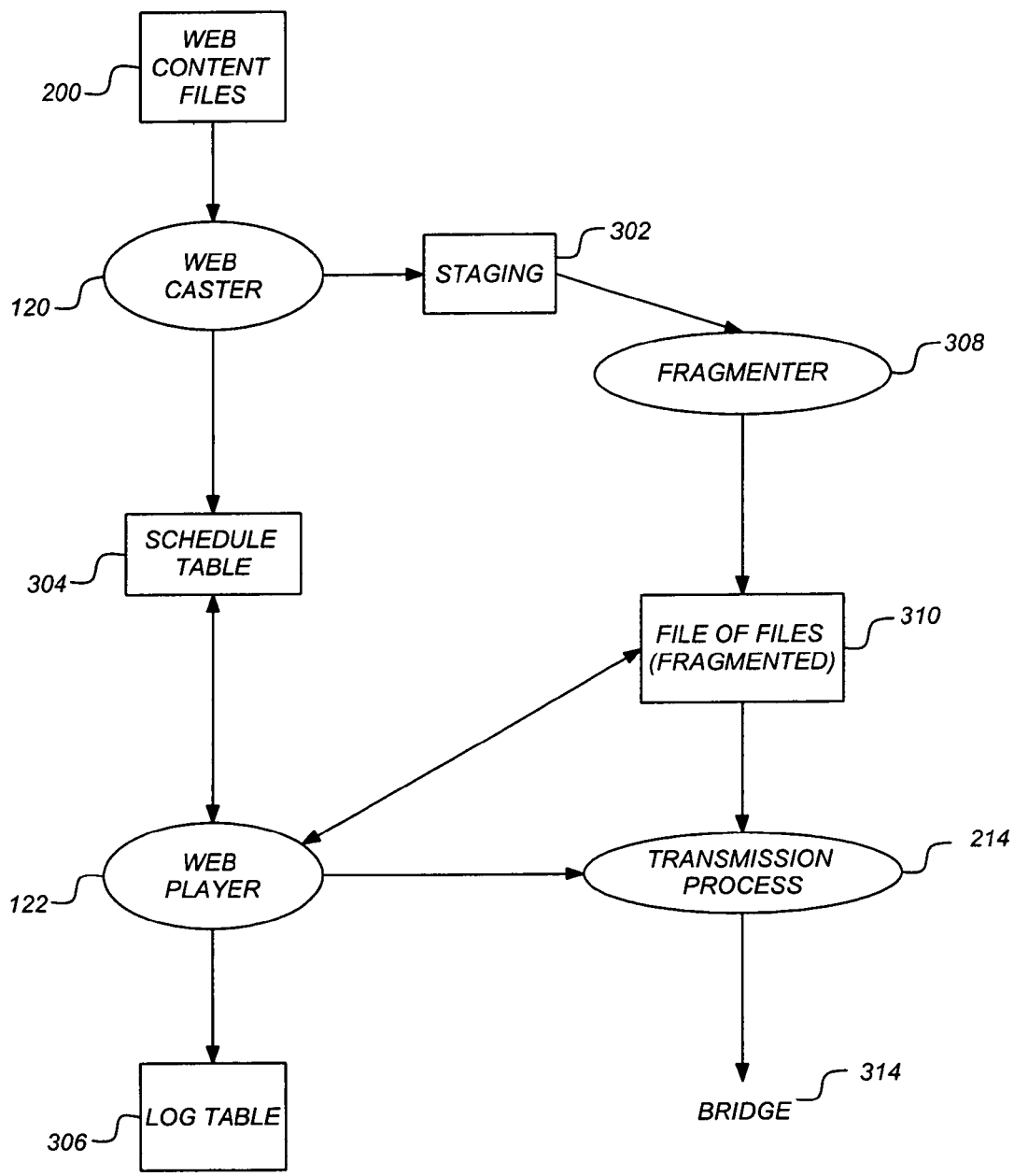
FIG. 3 illustrates the flow of information in accordance with one or more alternate embodiments of the invention.

FIG. 3 illustrates the flow of information in accordance with one or more alternate embodiments of the invention. Web caster 120 retrieves content files 200 from the Internet 124 and places the files in a staging area 302. As the files 200 are placed into staging area 302, web caster 120 also places information regarding the files 200 into the schedule table 304. For example, the information may be placed into the schedule table 304 at the rate of 8000 inserts per hour. In such an example, schedule table 304 maintains 8000 records per hour in addition to updates, archival, and deletion operations for those records. The files 200 in staging area 302 are removed by the fragmenter 308, fragmented, and placed into a file of fragmented files 310 in database 116. Web player 122 reads the schedule table 304 to determine the order to remove the fragmented files from the database 116. For example, Web player 122 may perform a multiple of 8000 reads or 8000 updates of schedule table 304 per hour. Web player 122 then reads the fragmented files in FIFO order from the file of files 310 in database 116 and delivers the fragmented files to be transmitted by satellite 128 across bridge 314 using the transmission process 214 as described above. Upon completing the transmission of a file (or failing), web player 122 erases the file from the file of files 310 and writes another file containing the remaining size and time of files in the file of files 310. Additionally, web player 122 may log the files processed in a log table 306.

The transmission of files illustrated in FIG. 3 is more efficient than merely transmitting a large list of files and resolves inconsistency problems between database 116 and the actual files. However, a significant number of database reads and writes may be performed when the staging area 302, fragmenter 308, and file of fragmented files 310 are operating such that disk read and write limits may be exceeded.

CONCLUSION

This concludes the description of the preferred embodiments of the present invention. In summary, the present invention describes a method, apparatus, and article of manufacture for transmitting files, email, newsgroup broadcast, web content, etc. to a satellite for broadcasting to clients.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of delivering web content files comprising:
gathering a web content file in a web caster;
preparing the web content file for transmission;
storing the prepared web content file in an archive of web content files ready for transmission to a satellite;
maintaining a queue of files, wherein the files in the queue include filenames of the web content files in the archive;
maintaining the length of the queue in a length/time feedback file;
reading the length of the queue from the length/time feedback file;
updating the archive and queue based on the length of the queue;
reading a filename from a file in the queue; and
transmitting the prepared web content file from the archive to the satellite wherein the prepared web content file is identified by the filename.

2. The method of claim 1, wherein the preparing comprises fragmenting the web content file.

3. The method of claim 1, wherein the preparing comprises scheduling the web content file for transmission by the satellite.

4. The method of claim 1, further comprising:
renaming and resetting a date/time stamp of the prepared web content file; and
wherein the maintaining comprises updating the queue with information relating to the renamed and date/time reset prepared web content file.

5. The method of claim 1 further comprising:
generating a name for the queue comprising a prefix from a database and a fixed suffix that is uncommon; and
providing said name for the queue to the web caster and a web player that is configured to perform the reading and transmitting steps.

6. The method of claim 1 wherein the web caster maintains the filenames in the queue sorted by a date/time of the web content files in the archive.

7. A system for delivering web content files comprising:
a web caster configured to:
gather a web content file;
prepare the web content file for transmission;
store the prepared web content file in an archive of web content files ready for transmission to a satellite;
maintain a queue of files, wherein the files in the queue include filenames of the web content files in the archive;
read the length of the queue from the length/time feedback file; and
update the archive and queue based on the length of the queue,
a web player configured to:
read a filename from a file in the queue; and
transmit the prepared web content file from the archive to the satellite wherein the prepared web content file is identified by the filename; and
maintain the length of the queue in the length/time feedback file.

8. The system of claim 7, wherein the web caster is configured to prepare the web content file by fragmenting the web content file.

9. The system of claim 7, wherein the web caster is configured to prepare the web content file by scheduling the web content file for transmission by the satellite.

10. The system of claim 7, wherein:
the web player is further configured to:
rename the prepared web content file;
reset a date/time stamp of the prepared web content file; and
the web caster is configured to maintain by updating the queue with information relating to the renamed and date/time reset prepared web content file.

11. The system of claim 7 wherein:
a name for the queue comprises a prefix from a database and a fixed suffix that is uncommon; and
said name for the queue is provided to the web caster and the web player.

12. The system of claim 7 wherein the web caster maintains the filenames in the queue sorted by a date/time of the web content files in the archive.

13. An article of manufacture comprising a program storage medium readable by a computer hardware device and embodying one or more instructions executable by the computer hardware device to perform a method for delivering web content files, the method comprising:
gathering a web content file in a web caster;
preparing the web content file for transmission;
storing the prepared web content file in an archive;
maintaining a queue of files, wherein the files in the queue include filenames of the web content files in the archive of web content files ready for transmission to a satellite;
maintaining a length of the queue in a length/time feedback file;
reading the length of the queue from the length/time feedback file;
updating the archive and queue based on the length of the queue;
a web player reading a filename from a file in the queue; and
transmitting the prepared web content file from the archive to the satellite wherein the prepared web content file is identified by the filename.

14. The article of manufacture of claim 13, wherein the preparing comprises fragmenting the web content file.

15. The article of manufacture of claim 13, wherein the preparing comprises scheduling the web content file for transmission by the satellite.

16. The article of manufacture of claim 13, the method further comprising:
renaming and resetting a date/time stamp of the prepared web content file; and
wherein the maintaining comprises updating the queue with information relating to the renamed and date/time reset prepared web content file.

17. The article of manufacture of claim 13 wherein the method further comprises:
generating a name for the queue comprising a prefix from a database and a fixed suffix that is uncommon; and
providing said name for the queue to the web caster and the web player.

18. The article of manufacture of claim 13 wherein the web caster maintains the filenames in the queue sorted by a date/time of the web content files in the archive.

19. A method of delivering web content files comprising:
gathering a web content file in a web caster;
preparing the web content file for transmission;
storing the prepared web content file in an archive of web content files ready for transmission to a satellite;
maintaining a queue of files, wherein the files in the queue include filenames of the web content files in the archive;

renaming and resetting a date/time stamp of the prepared web content file, wherein the maintaining comprises updating the queue with information relating to the renamed and date/time reset prepared web content file,
reading a filename from a file in the queue; and
transmitting the prepared web content file from the archive to the satellite wherein the prepared web content file is identified by the filename.

20. A method of delivering web content files comprising:
gathering a web content file in a web caster;
preparing the web content file for transmission;
storing the prepared web content file in an archive of web content files ready for transmission to a satellite;
maintaining a queue of files, wherein the files in the queue include filenames of the web content files in the archive;
reading a filename from a file in the queue;
transmitting the prepared web content file from the archive to the satellite wherein the prepared web content file is identified by the filename,
generating a name for the queue comprising a prefix from a database and a fixed suffix that is uncommon; and
providing said name for the queue to the web caster and a web player that is configured to perform the reading and transmitting steps.

21. A system for delivering web content files comprising:
a web caster configured to:
    gather a web content file;
    prepare the web content file for transmission;
    store the prepared web content file in an archive of web content files ready for transmission to a satellite;
    maintain a queue of files, wherein the files in the queue include filenames of the web content files in the archive;
a web player configured to:
    read a filename from a file in the queue; and
    transmit the prepared web content file from the archive to the satellite wherein the prepared web content file is identified by the filename;
    rename the prepared web content file; and
    reset a date/time stamp of the prepared web content file;
wherein the web caster is configured to maintain by updating the queue with information relating to the renamed and date/time reset prepared web content file.

22. A system for delivering web content files comprising:
a web caster configured to:
    gather a web content file;
    prepare the web content file for transmission;
    store the prepared web content file in an archive of web content files ready for transmission to a satellite;
    maintain a queue of files, wherein the files in the queue include filenames of the web content files in the archive;
a web player configured to:
    read a filename from a file in the queue; and
    transmit the prepared web content file from the archive to the satellite wherein the prepared web content file is identified by the filename;
wherein a name for the queue comprises a prefix from a database and a fixed suffix that is uncommon, and said name for the queue is provided to the web caster and the web player.

23. An article of manufacture comprising a program storage medium readable by a computer hardware device and embodying one or more instructions executable by the computer hardware device to perform a method for delivering web content files, the method comprising:
gathering a web content file in a web caster;
preparing the web content file for transmission;
storing the prepared web content file in an archive;
maintaining a queue of files, wherein the files in the queue include filenames of the web content files in the archive of web content files ready for transmission to a satellite;
a web player reading a filename from a file in the queue;
transmitting the prepared web content file from the archive to the satellite wherein the prepared web content file is identified by the filename;
renaming and resetting a date/time stamp of the prepared web content file; and
wherein the maintaining comprises updating the queue with information relating to the renamed and date/time reset prepared web content file.

24. An article of manufacture comprising a program storage medium readable by a computer hardware device and embodying one or more instructions executable by the computer hardware device to perform a method for delivering web content files, the method comprising:
gathering a web content file in a web caster;
preparing the web content file for transmission;
storing the prepared web content file in an archive;
maintaining a queue of files, wherein the files in the queue include filenames of the web content files in the archive of web content files ready for transmission to a satellite;
a web player reading a filename from a file in the queue;
transmitting the prepared web content file from the archive to the satellite wherein the prepared web content file is identified by the filename;
generating a name for the queue comprising a prefix from a database and a fixed suffix that is uncommon; and
providing said name for the queue to the web caster and the web player.

* * * * *